United States Patent [19]

Siebrecht et al.

[11] Patent Number: 5,043,194
[45] Date of Patent: Aug. 27, 1991

[54] TUBULAR PACKAGING CASING BASED ON CELLULOSE AND HAVING A TEXTILE-LIKE TEXTURE

[75] Inventors: Manfred Siebrecht, Wiesbaden; Klaus-Dieter Hammer, Mainz, both of Fed. Rep. of Germany

[73] Assignee: Hoechst Aktiengesellschaft, Frankfurt am Main, Fed. Rep. of Germany

[21] Appl. No.: 386,310

[22] Filed: Jul. 27, 1989

[30] Foreign Application Priority Data

Aug. 5, 1988 [DE] Fed. Rep. of Germany ....... 3826616

[51] Int. Cl.$^5$ ...................... F16L 11/00; A22C 13/00
[52] U.S. Cl. ................. 428/34.8; 138/118.1; 426/105; 426/135
[58] Field of Search ..................... 138/118.1; 428/34.8; 426/105, 135

[56] References Cited

U.S. PATENT DOCUMENTS 3,214,277 10/1965 Vaessen .................................. 99/175
4,036,037 7/1977 Huckfeldt ................................ 17/33
4,396,039 8/1983 Klenk et al. ......................... 428/34.8
4,555,408 11/1985 Gregor et al. ..................... 138/118.1

FOREIGN PATENT DOCUMENTS

| 0303328 | 2/1989 | European Pat. Off. . |
| 1951899 | 9/1966 | Fed. Rep. of Germany . |
| 2801545 | 7/1979 | Fed. Rep. of Germany . |
| 3018861 | 11/1980 | Fed. Rep. of Germany . |
| 8716138.9 | 3/1988 | Fed. Rep. of Germany . |
| 8804123.9 | 6/1988 | Fed. Rep. of Germany . |
| 8805545.0 | 8/1988 | Fed. Rep. of Germany . |
| 8806038.1 | 8/1988 | Fed. Rep. of Germany . |
| 3811440 | 12/1988 | Fed. Rep. of Germany . |
| 7003190 | 9/1971 | Netherlands ..................... 138/118.1 |
| 662543 | 10/1987 | Switzerland . |

Primary Examiner—James J. Seidleck
Attorney, Agent, or Firm—Foley & Lardner

[57] ABSTRACT

The tubular packaging casing, in particular artificial sausage casing, based on cellulose contains a textile sheet-shaped structure which is surrounded by cellulose and gives the outside of the casing a sturdy texture.

19 Claims, 1 Drawing Sheet

TUBULAR PACKAGING CASING BASED ON CELLULOSE AND HAVING A TEXTILE-LIKE TEXTURE

BACKGROUND OF THE INVENTION

The present invention relates to a tubular packaging casing, in particular an artificial sausage casing, based on cellulose and comprising a textile sheet-shaped structure.

As is known, tubular packaging casings of cellulose having a large diameter, in particular in the range from 30 to 180 mm, are reinforced with a fiber web bent to form a tube which is coated with cellulose on its inside and/or outside. In practice, this fiber reinforcement used for seamless tubular casings comprises special long-fibered papers on a basis of adhesively consolidated non-woven fabrics made of randomly deposited hemp fibers. Viscose and/or crosslinked cationic resins such as, for example, epichlorohydrin-polyamine polyamide resins, serve as the binders.

EP-A-0 058 240 has suggested to use also other sheet-shaped structures, for example, woven or knitted fabrics, instead of the customary fiber reinforcement, in the production of sausage casings having a glued seam in the direction of their longitudinal axes. According to this publication, these fabrics are impregnated with viscose solution while being in the web-shaped state and are then subjected to strong transverse stretching forces during regeneration and drying. For this purpose, the viscose-treated fiber web is held at the two edges, for example, by means of needle rollers, gripping clips or expanding rollers, and is stretched in the transverse direction. It is only the final web-shaped, fiber-reinforced cellulose that is bent to form a tube and the edge zones extending in the direction of the longitudinal axis are then joined by a glued seam. However, these casings have not been accepted in practice, due to various disadvantages as compared with seamless tubes.

Recently, wide-meshed tubular nets have been applied for purely decorative reasons to the outsides of seamless, fiber-reinforced cellulose-based sausage casings and have been adhesively bonded to the cellulose layer (DE-U-88 04 123.9). These casings give the sausages a particularly sturdy appearance, but their manufacture is relatively expensive. It is moreover also known to apply a tubular net only in the stuffing procedure to the ready-stuffed sausage (DE-U-88 06 038.1). In this process, the tubular net is, however, not fixed on the surface of the sausage and, as a consequence, it can easily slip and can gradually loosen during ripening of the sausage.

SUMMARY OF THE INVENTION

Accordingly, it is an object of the present invention to impart a decorative, sturdy appearance to the known tubular packaging casings based on cellulose, in particular, artificial sausage casings as used for long-keeping sausages or sausages of the salami type.

Another object of the present invention is to provide a packaging casing of cellulose having a decorative surface texture, which can be produced according to the conventional viscose process, in a simple and economic manner with the aid of the apparatus normally employed in this process.

In accomplishing the foregoing objectives, there has been provided, in accordance with one aspect of the present invention, a tubular packaging casing comprising an inner cellulose layer, a textile sheet-shaped structure comprising a woven fabric, a knitted fabric or a scrim, and an outer cellulose layer, wherein the inner and outer cellulose layers completely surround the textile sheet-shaped structure and wherein the thickness of the outer cellulose layer is such that the texture of the textile sheet-shaped structure is visible through the outer cellulose layer.

In accordance with another aspect of the present invention there is provided a process for the production of the above-described packaging casing, comprising the steps of bending a web-shaped reinforcement comprising a textile sheet-shaped structure to form a tube which comprises edges overlapping in the direction of the longitudinal axis of said tube, joining the edges to one another, coating the outside of the tube with viscose, and converting the viscose into regenerated cellulose, wherein the amount by weight of viscose applied to the outside of the tube is sufficient to form an outer cellulose layer of such thickness that the texture of the textile sheet-shaped structure is visible through the layer.

In accordance with yet another aspect of the present invention, there is provided a sausage product comprising a sausage meat emulsion and a packaging casing as described above.

Other objects, features and advantages of the present invention will become apparent to those skilled in the art from the following detailed description. It should be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

DETAILED DESCRIPTION OF PREFERRED EMBODIMENTS

Figure 1:
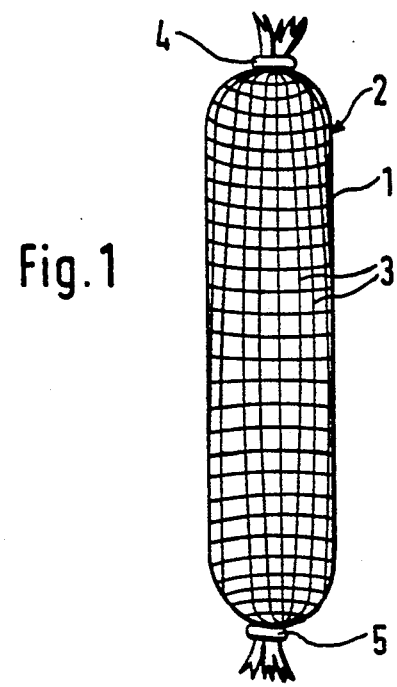

According to the invention, a textile sheet-shaped structure in the form of a woven fabric, knitted fabric or scrim is used in the seamless cellulose casing, instead of or in addition to a conventional fiber reinforcement. Woven fabrics and scrims comprise at least two thread systems crossing each other at right angles. Knitted fabrics or articles, on the other hand, are built up of meshes. A suitable knitted fabric comprises, for example, a net built up of individual meshes having a polygonal, preferably diamond-shaped, square or hexagonal basic form. The thread systems of the woven fabric or the meshes of the knitted fabric are formed of single or several, if appropriate intertwined, threads; the meshes are, for example, Raschelknit or braided. For reasons of simplicity, woven fabrics, knitted fabrics or scrims are, in the following, termed textile sheet-shaped structures.

The textile sheet-shaped structure which forms the reinforcement of the casing should preferably be disposed in such a way that the woven or knitted texture is readily visible on the outer surface of the casing. For this purpose, the thickness of the outer cellulose layer on the outside of the tubular, reinforced material should be below about 100μm, in particular below 50 μm. The outer cellulose layer is usually thinner than the inner cellulose layer on the inside of the tubular, reinforced material. This can also be expressed in terms of the thickness ratio between these cellulose layers, which is smaller than 1. In general, the thickness ratio between the outer and inner cellulose layers is in the range from about 4:6 to 1:9. Cellulose is also present between the individual threads of the textile sheet-shaped structure, which means that the threads are completely embedded in the cellulose layer. The textile sheet-shaped structure not only remains visible through the thin, transparent outer cellulose layer but, in a preferred embodiment, also imparts its woven or knitted texture to the outer surface layer of the casing. As a result, the casing and also the completed sausage exhibit a special textile-like surface effect.

In one embodiment, the customary fiber reinforcement in the form of a long-fibered paper is retained for the tubular casing. The long-fibered paper usually has a weight per unit area of 17 to 28g/m$^2$ and is made of hemp fibers. It is, however, also possible to use a consolidated non-woven structure comprising, in particular, a paper having a relatively low weight per unit area, especially up to 10 g/m$^2$, or another material, for example cellulose fibers, since the textile sheet-shaped structure contributes to the strength of the tube. The textile sheet-shaped structure is present on the outer surface of the nonwoven structure and is, if appropriate, bonded to this surface, for example laminated therewith using a suitable adhesive. In the simplest case, viscose is used as the adhesive, but it is also possible to bond the two layers by means of curable aminoplastics, compounds that are crosslinkable with epichlorohydrin, dispersions of acrylate, polyvinylacetate or PVC and other known substances. Bonding of the two layers is sufficiently strong, if the viscose-coated and impregnated composite stands up to the precipitating procedure, since thereafter the coagulated viscose or the regenerated cellulose, respectively, takes over the bonding function.

In this combination with a non-woven structure, the textile sheet-shaped structure has only a slight reinforcing action in the wall of the packaging casing and has, in the first place, the function of imparting a textile-like appearance to the outer surface of the casing. It is therefore possible for the textile sheet-shaped structures to have relatively low strength characteristics. The thickness of the threads can be reduced accordingly. The threads are made of natural and synthetic materials, for example, cotton, animal wool, regenerated cellulose, polyamide, polyester, polyacrylonitrile, polypropylene and glass. The weight per unit area of the composite comprising textile sheet-shaped structure and non-woven structure is about 20 to 400 g/m$^2$, in particular 30 to 200 g/m$^2$.

In another embodiment, the textile sheet-shaped structure is used without an additional fiber reinforcement or non-woven structure. It then serves to increase both the strength and the decorative character of the casing. For this embodiment it is preferred to employ a woven fabric, knitted fabric or scrim comprising cellulose fibers and, if appropriate, additionally synthetic fibers such as polyamide and/or polyester fibers. The blending ratio of cellulose fibers to synthetic fibers can be adjusted in such a way that up to 80%, in particular up to 60%, of synthetic fibers are substituted for the cellulose fibers.

The width of mesh or the spacing between two adjacent threads in the textile sheet-shaped structure can be chosen freely, depending on the effect to be achieved, however, for reasons of strength characteristics it should not exceed 20 mm, in particular 10 mm; about 0.1 mm, in particular 0.5 mm, is to be regarded as the lower limiting value. When the textile sheet-shaped structure is used without fiber reinforcement or non-woven structure, its mesh width or thread spacing is maximally 6 mm, especially maximally 4 mm.

The diameter of the individual threads can also be varied within wide ranges, depending on the desired strength characteristics of the casing and the optical effect to be achieved and is, in general, between 20 and 500 $\mu$m, in particular between 80 and 300 $\mu$m.

It is also possible to use different warp and weft threads in the textile sheet-shaped structure. For example, the threads extending in the longitudinal direction of the tubular casing may have a smaller thickness, for example 60 to 110 $\mu$m, than the threads extending in the transverse direction, which are for example 120 to 230 $\mu$m thick, or may comprise another material or have different characteristics.

The weight per unit area of the woven fabric, scrim or knitted fabric resulting from the mesh width or thread spacing and from the thickness of threads is usually in the range from 10 to 400 g/m$^2$, in particular from 25 to 200 g/m$^2$ and, prior to coating with viscose, the thickness of the textile sheet-shaped structure is in the range from 80 to 600 $\mu$m, in particular from 100 to 400 $\mu$m.

The packaging casing is produced according to the conventional viscose process for the manufacture of seamless fiber-reinforced tubes. The web-shaped scrim, woven fabric or knitted fabric, if required in the form of a composite comprising a customary fiber reinforcement or a consolidated non-woven structure is formed into a tube with overlapping edges in the direction of the longitudinal axis.

In general, the overlap is chosen to be a little wider than the overlap customarily used in the manufacture of fiber-reinforced tubular cellulose casings. It usually amounts to about 3 to 10 mm, or 5 to 15% of the tube circumference.

When a composite comprising a textile sheet-shaped structure and a fiber reinforcement or non-woven structure is used, the tube is formed in such a way that the textile sheet-shaped structure is on the outside of the tube.

For adhesively bonding the overlapping edges of the textile sheet-shaped structure bent to form a tube, viscose emerging from a die is introduced into the overlapped seam. The tube is then impregnated and coated with viscose on its inside and/or outside. The quantity of viscose applied to the outside is determined to show the texture of the textile sheet-shaped structure through the resulting cellulose layer. When both sides of the tube are treated with viscose, the latter is distributed in such a way that the major amount is present on the inside of the tube. The viscose enters into the interstices between the threads and envelops the threads virtually completely. For the viscose treatment the customary coating dies are employed, the annular gaps of which must, however, be enlarged accordingly, owing to the greater thickness of the textile sheet-shaped structure, compared with the hitherto used fiber reinforcements.

Coagulation of the viscose with an acidic precipitating solution and its conversion into regenerated cellulose are accomplished according to the conventional method. The process described can be carried out in a simple manner, without any great changes in equipment or additional process steps, since the customary fiber reinforcement is replaced by the textile sheet-shaped structure or bonded thereto.

Depending upon the thickness of the outer cellulose layer, the tubes obtained exhibit a more or less strongly textured textile-like outer surface corresponding to the textile sheet-shaped structure used. The elevations formed by the threads of the woven fabric, scrim or knitted fabric protrude up to about 0.3 mm, in particular up to 50 μm, from the surface of the tube. The weight per unit area of the packaging casing, measured at a water content in the range from 10 to 25% by weight and a glycerol content of 18 to 25% by weight, each based on the total weight of the casing, is, in general, in the range from 60 to 600 g/m², preferably in the range from 100 to 300 g/m² and substantially depends on the weight of the textile sheet-shaped structure used.

The casing shows the usual characteristics of fiber-reinforced cellulose casings, it does not adversely influence the smoking and ripening process and shrinks during storage of the sausage, in conformity with the sausage meat giving off water. It can therefore particularly advantageously be used as a sausage casing permeable to water vapor, for all types of dry sausages.

If required, the casing has a customary coating on its inner and/or outer surface, for example, an internal impregnation to increase the adhesion between the sausage meat and the cellulose wall or to improve the peeling characteristics, an outer coating comprising fungicides or a barrier layer which prevents, for example, the penetration of atmospheric oxygen. For stuffing with sausage meat, the casing can be used in the form of a section closed at one end or in the shirred state, as a so-called shirred stick, the usual stuffing apparatus being used in the process.

The invention is explained in detail by the following examples:

EXAMPLE 1

A 210 mm wide, strip-shaped web of a long-fibered paper is laminated on one side with a fabric made of polyester threads, using a PVC-based adhesive. The threads are woven to form warp and weft threads showing irregular spacings of 1 to 6 mm. The two-layer web is formed into a tube which has the fabric on its outside and is impregnated and coated with viscose on the inside and outside, by means of viscose dies as disclosed in DE-C-19 65 130. The quantitative proportion of viscose is 20% on the outside and 80% on the inside of the tube. The tube coated with viscose on the inside and outside is treated with an acidic precipitating liquid in the customary manner and the viscose is converted into regenerated cellulose. After passing through the usual washing and plasticizing baths, the tube is dried in the inflated state.

The casing is stuffed with sausage meat of the salami type without difficulty and the sausage obtained is subjected to the normal ripening process. The fabric is readily visible on the surface of the completed sausage and gives the sausage the desired appearance.

EXAMPLE 2

A 210 mm wide, strip-shaped web of a fabric is formed into a tube and impregnated and coated with viscose on the inside and outside. The fabric comprises a blend of 80% of cotton threads and 20% of polyamide threads, the thread thickness is about 200 μm the weight per unit area 25 g/m², the spacing of the warp threads is about 2 mm and the spacing of the weft threads about 1 to 2 mm. The quantitative distribution of the viscose is 70% on the inside and 30% on the outside of the tube. The viscose-treated tube is precipitated, regenerated, washed, plasticized and dried in the usual manner.

The casing is stuffed with sausage meat for dry sausages to produce a filling diameter of 65 mm. The ripening process of the sausage and shrinking of the casing upon drying of the sausage during storage proceed perfectly. The embedded fabric is readily visible on the completed sausage.

Figure 2:
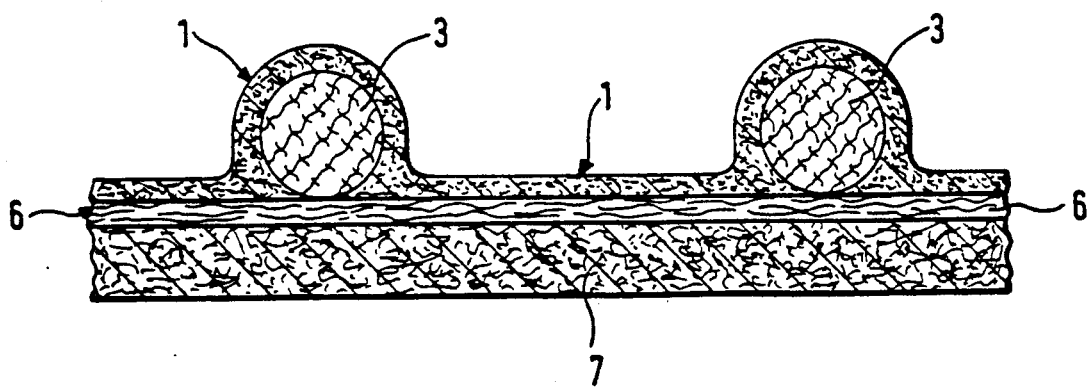

The invention is illustrated by FIGS. 1 and 2.

FIG. 1 shows a sausage prepared using an embodiment of the sausage casing of this invention and FIG. 2 shows an enlarged sectional view of the sausage casing.

In FIG. 1, the threads 3 of a woven fabric are clearly discernible through the outer cellulose layer 1 (FIG. 2) of the sausage casing 2. The ends of the sausage are tied off by means of metal clips 4 and 5. FIG. 2 shows the sausage casing with an outer cellulose layer 1 surrounding the threads 3 and a non-woven fabric 6 made from a long-fibered paper. Another, relatively thick cellulose layer 7 forming the inner wall of the tubular casing is provided on the reverse side of the non-woven fabric 6.

What is claimed is:

1. A tubular seamless packaging casing comprising
   a) a inner cellulose layer,
   b) a textile sheet-shaped structure comprising a plurality of threads which form a woven fabric, a knitted fabric or a scrim, and
   c) an outer cellulose layer, wherein said inner and outer cellulose layers completely surround said plurality of threads of said textile sheet-shaped structure and wherein the thickness of said outer cellulose layer is such that the texture of said textile sheet-shaped structure is visible through said outer cellulose layer.

2. A packaging casing as claimed in claim 1, wherein the ratio of the thickness of said outer cellulose layer to said inner cellulose layer is less than 1.

3. A packaging casing as claimed in claim 2, wherein said ratio is about 4:6 to 1:9.

4. A packaging casing as claimed in claim 1, wherein the weight per unit area of said textile sheet-shaped structure is about 10 to 400 g/m².

5. A packaging casing as claimed in claim 1 wherein the weight per unit area of said packaging casing is about 60 to 600 g/m², measured at a water content of 10 to 25% by weight and a glycerol content of 18 to 25% by weight, each based on the total weight of the casing.

6. A packaging casing as claimed in claim 1, wherein said textile sheet-shaped structure comprises cellulose threads.

7. A packaging casing as claimed in claim 6, wherein said textile sheet-shaped structure further comprises synthetic threads.

8. A packaging casing as claimed in claim 7, wherein said synthetic threads comprise a polyamide or a polyester.

9. A packaging casing as claimed in claim 7, wherein said textile sheet-shaped structure comprises up to about 80% by weight of said synthetic threads.

10. A packaging casing as claimed in claim 1, wherein said outer cellulose layer is thinner than the threads in said textile sheet-shaped structure.

11. A packaging casing as claimed in claims 1, wherein said textile sheet-shaped structure shows a thread spacing or a mesh width of about 0.5 to 20 mm.

12. A packaging casing as claimed in claim 11, wherein said textile sheet-shaped structure shows a thread spacing or a mesh width of 1 to 6 mm.

13. A packaging casing as claimed in claim 1 wherein the thickness of the threads in said textile sheet-shaped structure is about 20 to 500 μm.

14. A packaging casing as claimed in claim 13, wherein the thickness of the threads in said textile sheet-structure is 80 to 300 μm.

15. A packaging casing as claimed in claim 1, wherein said textile sheet-shaped structure is bonded to a consolidated non-woven structure, to form a composite, the non-woven forming the inside of said composite.

16. A packaging casing as claimed in claim 15, wherein said consolidated non-woven structure is a long-fibered paper.

17. A packaging casing as claimed in claim 15, wherein the weight per unit area of said composite is about 20 to 400 g/m$^2$.

18. A packaging casing as claimed in claim 1, wherein the texture of said textile sheet-shaped structure is imparted to said outer surface layer of said casing.

19. A sausage product comprising a sausage meat emulsion and a packaging casing as claimed in claim 1.

* * * * *